(12) United States Patent
Garney et al.

(10) Patent No.: US 7,158,532 B2
(45) Date of Patent: ***Jan. 2, 2007

(54) HALF DUPLEX LINK WITH ISOCHRONOUS AND ASYNCHRONOUS ARBITRATION

(75) Inventors: John I. Garney, Aloha, OR (US); Brent S. Baxter, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 265 days.

(21) Appl. No.: 09/215,559

(22) Filed: Dec. 18, 1998

(65) Prior Publication Data

US 2003/0120739 A1   Jun. 26, 2003

Related U.S. Application Data

(63) Continuation-in-part of application No. 09/110,344, filed on Jul. 6, 1998, now Pat. No. 6,119,243.

(51) Int. Cl.
   *H04L 5/16* (2006.01)

(52) U.S. Cl. ................ 370/447; 370/461

(58) Field of Classification Search .......... 370/276, 370/277, 285, 252, 296, 297, 292, 462; 710/100, 710/101, 107, 113, 114, 115, 120, 123, 126, 710/129, 241

See application file for complete search history.

(56) References Cited

U.S. PATENT DOCUMENTS

| | | | | |
|---|---|---|---|---|
| 4,779,089 A | * | 10/1988 | Theus | 710/244 |
| 5,327,428 A | * | 7/1994 | Van As et al. | 370/353 |
| 5,504,757 A | * | 4/1996 | Cook et al. | 370/468 |
| 5,592,629 A | * | 1/1997 | Gamble | 710/51 |
| 5,790,813 A | * | 8/1998 | Whittaker | 710/113 |
| 5,828,656 A | * | 10/1998 | Sato et al. | 370/254 |
| 5,898,892 A | * | 4/1999 | Gulick | 710/107 |
| 5,915,127 A | * | 6/1999 | Ogawa et al. | 710/58 |
| 5,982,779 A | * | 11/1999 | Krishnakumar | 370/447 |

(Continued)

*Primary Examiner*—Hassan Kizou
*Assistant Examiner*—Salman Ahmed
(74) *Attorney, Agent, or Firm*—Kenyon & Kenyon LLP

(57) ABSTRACT

Transactions are scheduled over a half duplex link between a first device, such as an IO unit, and a second device, such as a memory controller. Information flowing over the half duplex link is divided into a plurality of service periods, and an isochronous transaction, such as an isochronous memory read or write, is scheduled in a service period N if the isochronous transaction is ready to be serviced before service period N at the first or second device. An asynchronous transaction ready to be serviced at the first or second device, such as an asynchronous memory read or write, is scheduled if no isochronous transaction is ready to be serviced. The asynchronous transaction may be scheduled by (a) scheduling an asynchronous transaction ready to be serviced at the first device if no asynchronous transaction is ready to be serviced at the second device; (b) scheduling an asynchronous transaction ready to be serviced at the second device if no asynchronous transaction is ready to be serviced at the first device; and (c) scheduling an asynchronous transaction ready to be serviced at the first or second device, according to an arbitration algorithm, if asynchronous transactions are ready to be serviced at both the first device and the second device. The amount of buffer space available in the first or second device may also be used to schedule asynchronous transactions.

13 Claims, 6 Drawing Sheets

U.S. PATENT DOCUMENTS

| | | | |
|---|---|---|---|
| 6,012,117 A * | 1/2000 | Traw | 710/123 |
| 6,032,190 A * | 2/2000 | Bremer et al. | 709/238 |
| 6,032,211 A * | 2/2000 | Hewitt | 710/107 |
| 6,041,286 A * | 3/2000 | White | 702/176 |
| 6,088,517 A * | 7/2000 | Wanner et al. | 710/110 |
| 6,105,094 A * | 8/2000 | Lindeman | 710/107 |
| 6,134,625 A * | 10/2000 | Abramson | 710/241 |
| 6,148,357 A * | 11/2000 | Gulick | 710/128 |
| 6,151,651 A * | 11/2000 | Hewitt et al. | 710/315 |
| 6,192,428 B1 * | 2/2001 | Abramson et al. | 710/52 |
| 6,199,132 B1 * | 3/2001 | Hewitt et al. | 710/107 |
| 6,260,119 B1 * | 7/2001 | Garney et al. | 711/150 |
| 6,351,783 B1 * | 2/2002 | Garney | 710/107 |
| 6,411,628 B1 * | 6/2002 | Hauck | 370/447 |
| 6,425,021 B1 * | 7/2002 | Ghodrat | 710/22 |
| 6,457,081 B1 * | 9/2002 | Gulick | 710/305 |
| 6,587,477 B1 * | 7/2003 | Takeda et al. | 370/468 |
| 6,690,676 B1 * | 2/2004 | Gulick | 370/458 |
| 6,701,399 B1 * | 3/2004 | Brown | 710/114 |

\* cited by examiner

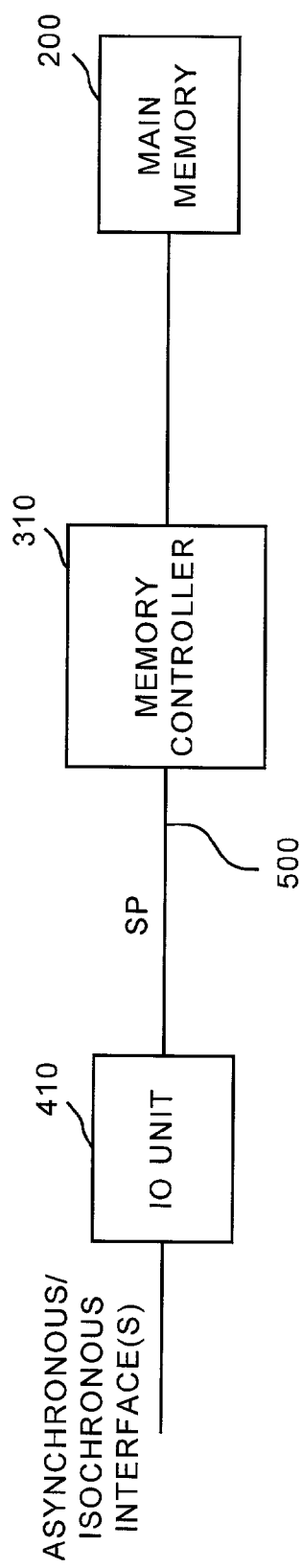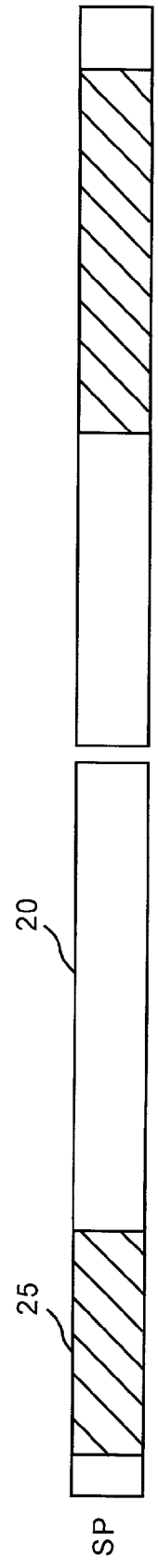

HALF DUPLEX LINK WITH ISOCHRONOUS AND ASYNCHRONOUS ARBITRATION

CROSS REFERENCE TO RELATED APPLICATIONS

The present invention is a continuation-in-part of U.S. patent application Ser. No. 09/110,344, entitled "Architecture for the Isochronous Transfer of Information Within a Computer System," to John I. Garney and Brent S. Baxter, filed on Jul. 6, 1998 now abandoned and assigned to Intel Corporation.

FIELD

The present invention relates to the transfer of information in a computer system. More particularly, the present invention relates to the scheduling of isochronous and asynchronous transactions over a half duplex link in a computer system.

BACKGROUND

Information, such as information representing audio, video and multimedia content, can be transferred within a computer system. Consider, for example, FIG. 1, which illustrates a known architecture for connecting an external Input/Output (IO) device 10 to a computer system 100. The computer system 100 includes a processor 110 coupled to a main memory 200 through a memory controller 300. The external IO device 10 communicates with an IO unit 400, which is also coupled to the memory controller 300.

The external IO device 10 can, for example, transfer "asynchronous" information with the IO unit 400, which in turn transfers information with the memory controller 300. When a transfer of information is asynchronous, delays can occur that interfere with the timely completion of the transfer. Typically, other, more important, activities can delay an information transfer without adversely impacting system performance. In some types of information streams, however, even a minor delay or gap will noticeably degrade the quality of the information, such as by causing a momentary freeze in a video transmission or by introducing a stuttering effect in an audio transmission.

When a transfer of information is "isochronous," a sending and receiving device are partly synchronized, generally without using the same clock signal, and the sending device transfers information to the receiving device at regular intervals. Such transfers can be used, for example, when information needs to arrive at the receiving device at the same rate it is sent from the sending device, but without precise synchronization of each individual data item. The IEEE 1394 standard (1995), entitled "High Performance Serial Bus" and available from the Institute of Electrical and Electronic Engineers, is one example of an interface that supports the isochronous transfer of information.

In addition to the isochronous transfer of information between the external IO device 10 and the computer system 100, the transfer of information within the computer system 100 may also be isochronous. U.S. patent application Ser. No. 09/110,344, entitled "Architecture for the Isochronous Transfer of Information Within a Computer System," to John I. Garney and Brent S. Baxter, filed on Jul. 6, 1998 and assigned to Intel Corporation, discloses an architecture that provides for the isochronous transfer of information within a computer system.

In this case, the IO unit 400 may perform both isochronous and asynchronous information transfers, or "transactions," with the memory controller 300. In addition, the IO unit 400 may have several different transactions to be sent to (or received from) the memory controller 300 at substantially the same time. Similarly, the memory controller 300 may have several different transactions to be sent to (or received from) the IO unit 400.

The connection 500, or "link," between the IO unit 400 and the memory controller 300, however, is typically a "half duplex" link. A half duplex link between two devices is one that lets information be transferred in both directions, that is from the first to the second device and from the second to the first device, but not in both directions at the same time.

Because both the IO unit 400 and the memory controller 300 may each have information that is ready to be transferred over the half duplex link 500, or transactions that are "ready to be serviced," particular transactions can be selected to be transferred across the link 500, or "scheduled." Such scheduling poses a number of problems. For example, if an asynchronous transaction is scheduled when an isochronous transaction is ready to be serviced, the benefits of using an isochronous stream of information, such as making sure that information flows continuously and at a steady rate, may be reduced or lost altogether.

To solve this problem, one or more large data buffers, such as one or more First-In, First-Out (FIFO) data buffers, can be provided to store isochronous information when the half duplex link 500 cannot be accessed. In this case, information being transferred, for example, between the IO device 10 and the main memory 200 can be stored to, or retrieved from, various buffers when the half duplex link 500 is not available. This buffering can accommodate delays thereby reducing the gaps in an isochronous stream within the computer system 100. Such buffering, however, may increase the cost, lower the performance and make the computer system 100 more difficult to build and test. Moreover, information within the computer system 100 may still not be transferred in a reliable and timely fashion if the delays are too long.

SUMMARY

In accordance with an embodiment of the present invention, transactions are scheduled over a half duplex link between a first device and a second device. Information flowing over the half duplex link is divided into a plurality of service periods, and an isochronous transaction is scheduled in service period N if the isochronous transaction is ready to be serviced before service period N at the first or second device. An asynchronous transaction ready to be serviced at the first or second device is scheduled in service period N if no isochronous transaction is ready to be serviced before service period N.

BRIEF DESCRIPTION OF THE DRAWINGS

FIGS. 2 and 3 illustrate the use of service periods to schedule isochronous and asynchronous transactions over a half duplex link.

DETAILED DESCRIPTION

Figure 1:
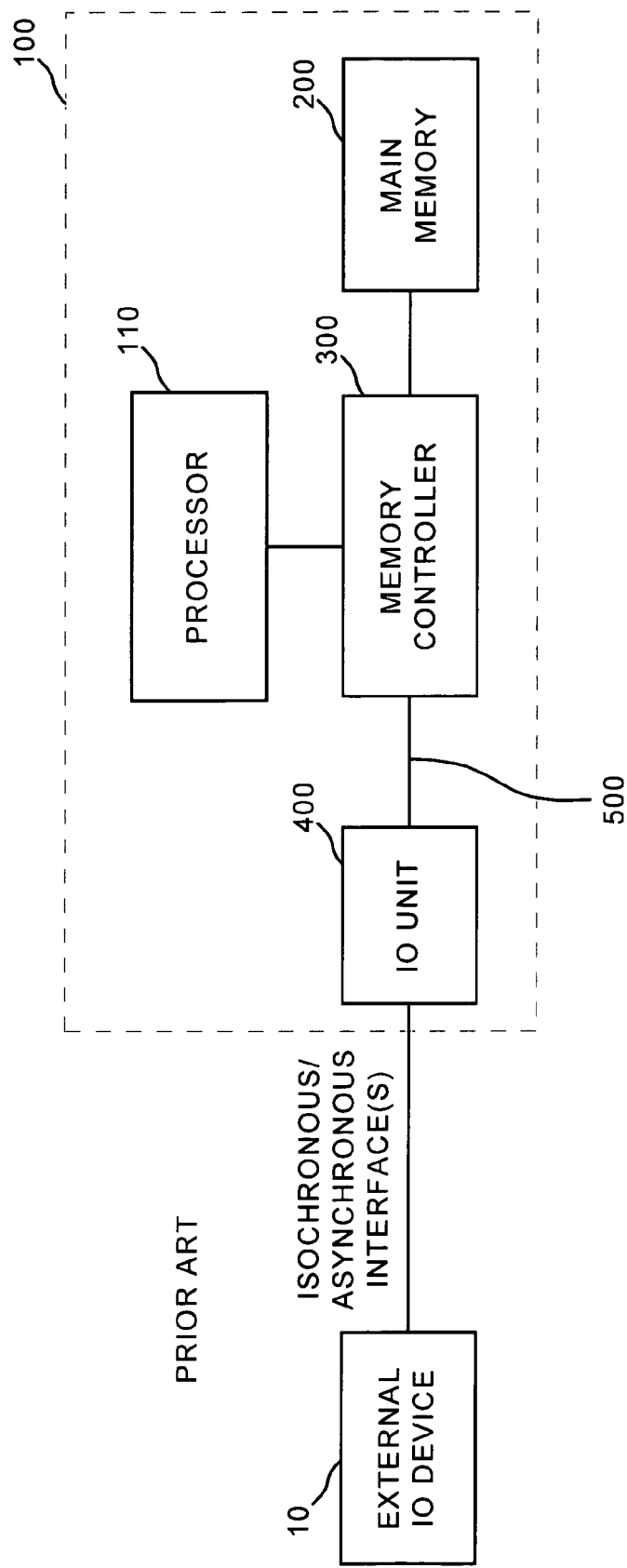
FIG. 1 illustrates a known architecture for connecting an external IO device to a computer system.

An embodiment of the present invention is directed to the scheduling of isochronous and asynchronous transactions over a half duplex link in a computer system. Referring now in detail to the drawings wherein like parts are designated by like reference numerals throughout, FIGS. 2 and 3 illustrate the use of service periods to schedule such transactions over the half duplex link. In particular, FIG. 2 is a block diagram of a computer system according to an embodiment of the present invention. Both an isochronous stream of information and asynchronous information may be transferred between, for example, one or more external devices (not shown in FIG. 2) and an IO unit 410. The IO unit 410 transfers information with a memory controller 310 over a half duplex link 500. Information is also transferred between the memory controller 310 and a main memory 200.

As used herein, isochronous and asynchronous information may be "transferred" between the IO unit 410 and the memory controller 310 by sending the information to, or receiving the information from, the memory controller 310.

Consider a transfer of information to the memory controller 310. The memory controller 310 may receive both isochronous and asynchronous information from the IO unit 410 to be stored in the main memory 200. For example, the IO unit 410 may send a stream of information to the memory controller 310, and the stream may be divided into a plurality of "service periods." FIG. 3 illustrates how each service period (SP) can be used to transfer both isochronous and asynchronous information. Each service period has a first "duration" 20 or amount of information, shown as the white portion in FIG. 3, associated with asynchronous information.

Each service period also has a second duration 25 or amount of information, shown as the shaded portion in FIG. 3, associated with isochronous information. Although each service period has a single isochronous portion 25, exactly where the isochronous amount of information 25 falls in the service period can vary between service periods. A single service period may contain a number of isochronous requests, which are serviced all at once or distributed throughout the service period. In addition, an isochronous request made in service period N may be serviced, for example, in service period N+1 resulting in a pipelined system as opposed to a system in which strict priority is determined at arrival time (as with typical asynchronous transactions). Further, the length of the isochronous amount of information 25 may vary from service period to service period up to some previously established maximum. That is, the maximum number of isochronous transactions in a single service period can be limited.

Referring again to FIG. 1, both the IO unit 410 and the memory controller 310 may each have several transactions, including isochronous and/or asynchronous transactions, waiting to be transferred over the half duplex link 500. As explained with respect to FIGS. 4 to 7, these ready for service transactions may be scheduled, such as by scheduling the transactions in a given service period. According to one embodiment of the present invention, isochronous transactions requested in one service period are transferred in the next service period (not earlier or later) to preserve the isochronous nature of the information. Asynchronous transactions can be transferred whenever possible.

Figure 4:
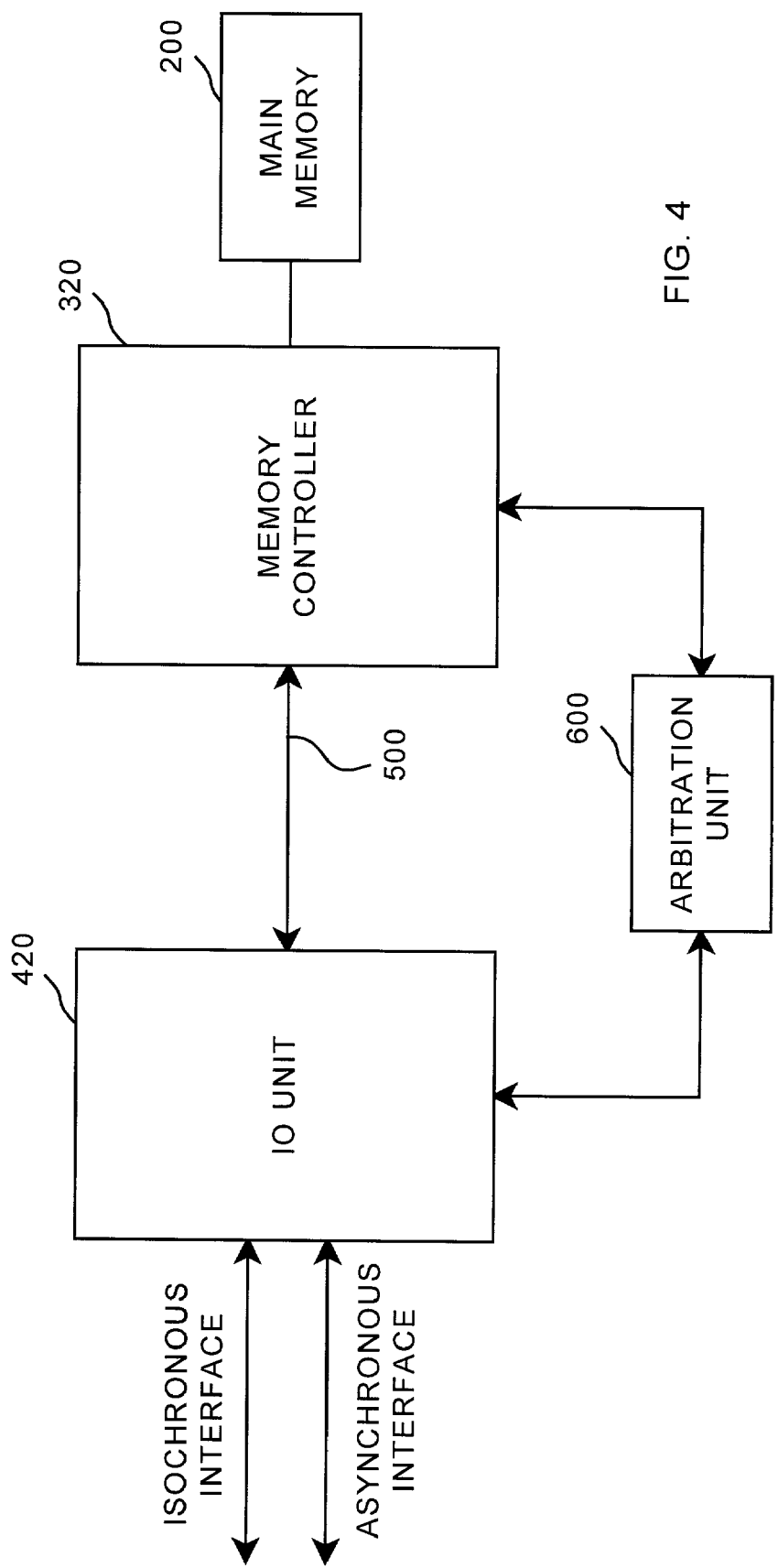
FIG. 4 is a block diagram of a system that schedules isochronous and asynchronous transactions over a half duplex link according to an embodiment of the present invention.

FIG. 4 is a block diagram of a system that schedules isochronous and asynchronous transactions over a half duplex link 500 according to an embodiment of the present invention. The system includes an IO unit 420 that communicates with a memory controller 320 over the half duplex link 500. As described above, the IO unit 420 may transfer both isochronous and asynchronous information with one or more other devices, such as external IO devices (not shown in FIG. 4), and the memory controller 320 may transfer information with a main memory 200.

According to this embodiment of the present invention, an arbitration unit 600 is coupled to both the IO unit 420 and the memory controller 320. The arbitration unit 600 is configured to schedule isochronous and asynchronous transactions to be transferred over the half duplex link 500. Consider, for example, the case where the IO unit 420 has a ready for service asynchronous transfer of information to (or from) the memory controller 320, and the memory controller 320 has a ready for service isochronous transfer of information to (or from) the IO unit 420. In this case, the arbitration unit 600 may instruct both the IO unit 420 and the memory controller 320 that the next transaction that will be transferred is the isochronous transaction. In this way, the benefits of using an isochronous stream of information, such as making sure that information flows continuously, and at a steady rate, are maintained.

Consider now the case where the IO unit 420 has a ready for service asynchronous transfer of information to (or from) the memory controller 320, and the memory controller 320 also has a ready for service asynchronous transfer of information to (or from) the IO unit 420. In this case, the arbitration unit 600 must decide which device's ready for service transaction should be scheduled next. In this case, any of a number of known arbitration algorithms may be used. If more asynchronous transactions are ready than can be accommodated in a single service period, the excess are deferred to subsequent service periods. For example, the arbitration unit 600 may select ready for service transactions from each of the devices 420, 320 alternately. The arbitration unit 600 may instead, if desired, schedule the transaction that first became ready to be serviced.

Similarly, if there are isochronous transactions ready to transfer in both directions at the same time, the arbitration unit 600 may select which transaction to transfer. This selection may be performed in a number of different ways to ensure that no isochronous transaction is transferred in an earlier, or later, service period to preserve the isochronous nature of the information. According to an embodiment of the present invention, other isochronous arbitration methods may schedule the transactions in a different order from the methods shown in the figures, provided all isochronous transactions in a given service period are transferred sometime during that service period.

Figure 5:
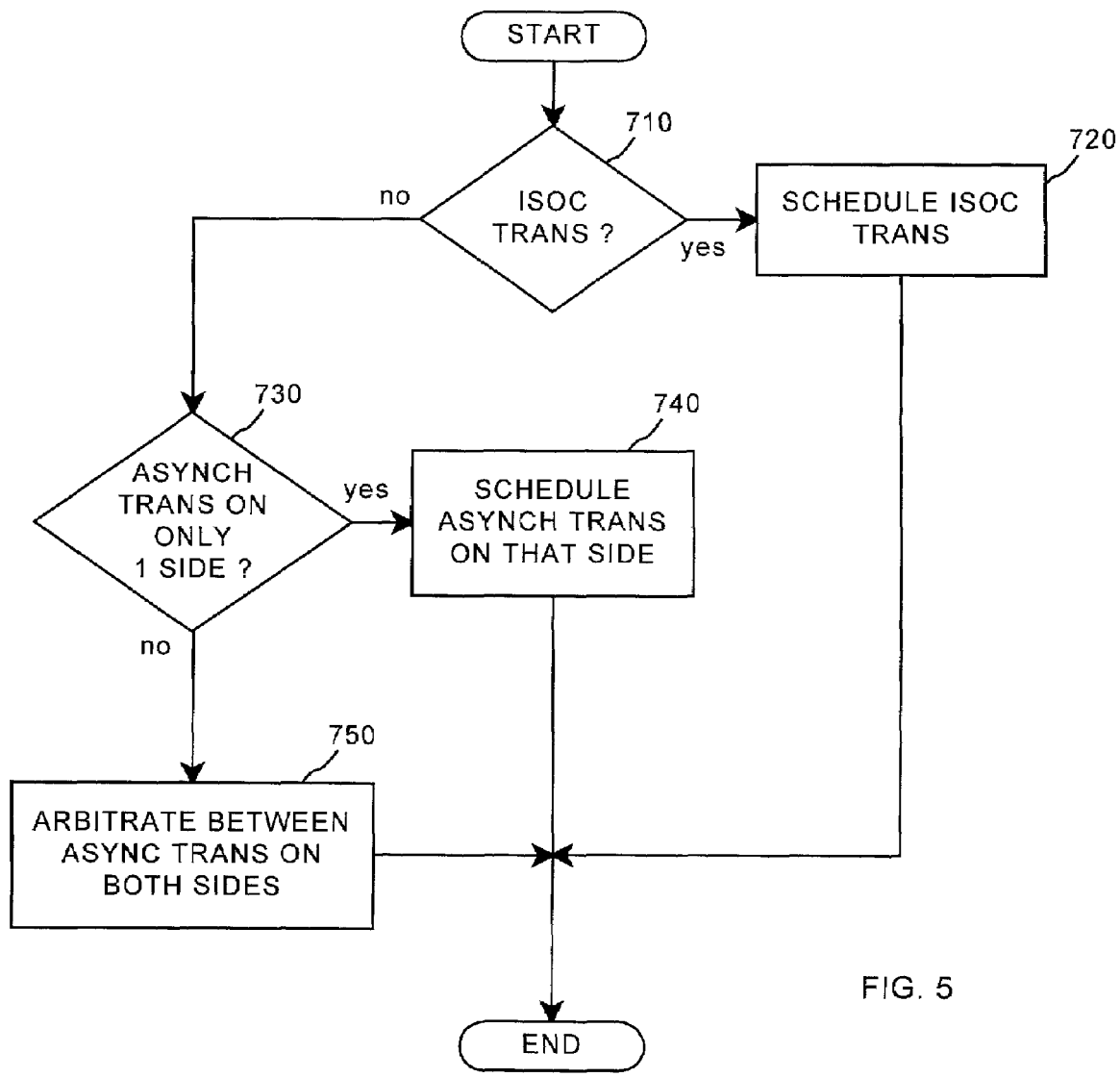
FIG. 5 is a flow diagram of a method for scheduling isochronous and asynchronous transactions over a half duplex link between a first device and a second device according to an embodiment of the present invention.

FIG. 5 is a flow diagram of a method for scheduling transactions over a half duplex link between a first device and a second device according to an embodiment of the present invention. Such a method may be performed, for example, by the arbitration unit 600 shown in FIG. 4.

Obviously, if no transaction is ready to be serviced at either device, this method does not need to be performed at all. If, on the other hand, an isochronous transaction is ready to be serviced at either device (710), the isochronous transaction is scheduled to be transferred over the half duplex link (720). If there are isochronous transactions ready to transfer in both directions at the same time, use some algorithm to select which isochronous transaction direction to transfer. This selection can still ensure that no isochronous transaction is transferred in an earlier (or later) service period. According to an embodiment of the present invention, the total number of isochronous transactions in a service period may not exceed the number of possible transactions in a service period. In this case, almost any algorithm for isochronous transactions can be used to service the transactions that are ready to be serviced in a service period.

If no isochronous transaction is ready to be serviced at either device (710), it is determined whether an asynchronous transaction is ready to be serviced at only one of the devices (730). In other words, it is determined if an asynchronous transaction is ready to be serviced at only one side of the half duplex link. If so, the asynchronous transaction ready to be serviced at that one device is scheduled to be transferred over the half duplex link (740). If more than one asynchronous transaction is ready to be serviced at that device, any traditional scheduling technique, such as FIFO, may be used.

If asynchronous transactions are ready to be serviced at both devices (730), arbitration is required to select which device's transaction should be scheduled over the half duplex link at (750). Any of several known arbitration algorithms, such as alternating between the two devices, may be used for this purpose.

Figure 6:
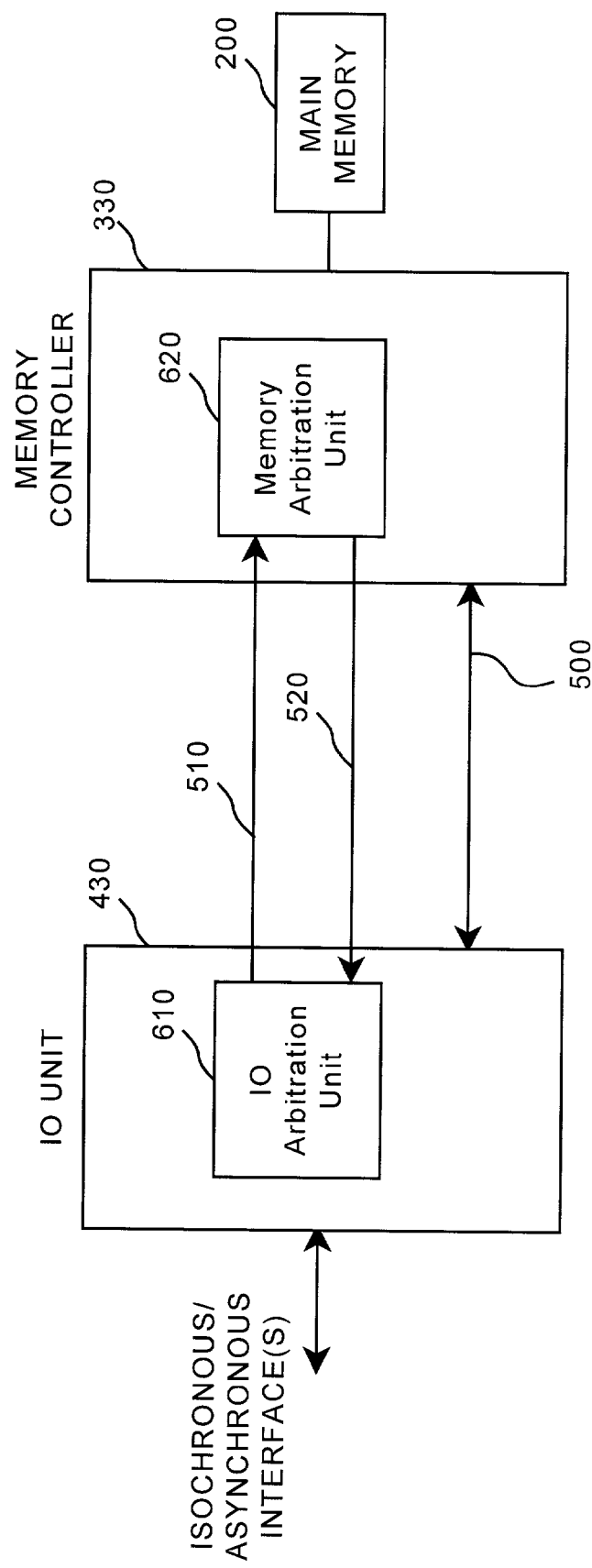
FIG. 6 is a block diagram of a system that schedules isochronous and asynchronous transactions over a half duplex link according to another embodiment of the present invention.

FIG. 6 is a block diagram of a system that schedules isochronous and asynchronous transactions over a half duplex link 500 according to another embodiment of the present invention. As with FIG. 4, the system includes an IO unit 430 that communicates with a memory controller 330 over the half duplex link 500. As described above, the IO unit 430 may transfer both isochronous and asynchronous information with one or more other devices, such as external IO devices (not shown in FIG. 6), and the memory controller 330 may transfer information with a main memory 200.

According to this embodiment of the present invention, the IO unit 430 includes an IO arbitration unit 610 and the memory controller 330 includes a memory arbitration unit 620. The IO arbitration unit 610 determines which transaction ready to be serviced at the IO unit 430, if any, should be scheduled to be transferred over the half duplex link 500. Likewise, the memory arbitration unit 620 determines which transaction ready to be serviced at the memory controller 330, if any, should be scheduled to be transferred over the half duplex link 500. Both the IO arbitration unit 610 and the memory arbitration unit 620 may use a method such as the one described with respect to FIGS. 4 and 5 to make this determination.

Note that the IO arbitration unit 610 can send information, such as information about ready for service transactions, to the memory arbitration unit 620 over a communication link 510. The memory arbitration unit 620 can also send this type of information to the 10 arbitration unit 610 over a communication link 520. In this way, both the IO arbitration unit 610 and the memory arbitration unit 620 can use the same information to make the same determination about which ready for service transaction should be scheduled to be transferred over the half duplex link 500. This is important because if the two arbitration units 610, 620 reach different conclusions, a "collision," or both sides attempting to transfer information over the half duplex link simultaneously, may occur. In various embodiments of the present invention the additional communication pathways 510, 520 may comprise extra wires added to the half duplex link, information in a transaction header (without the use of new wires), or some combination of the two.

Figure 7:
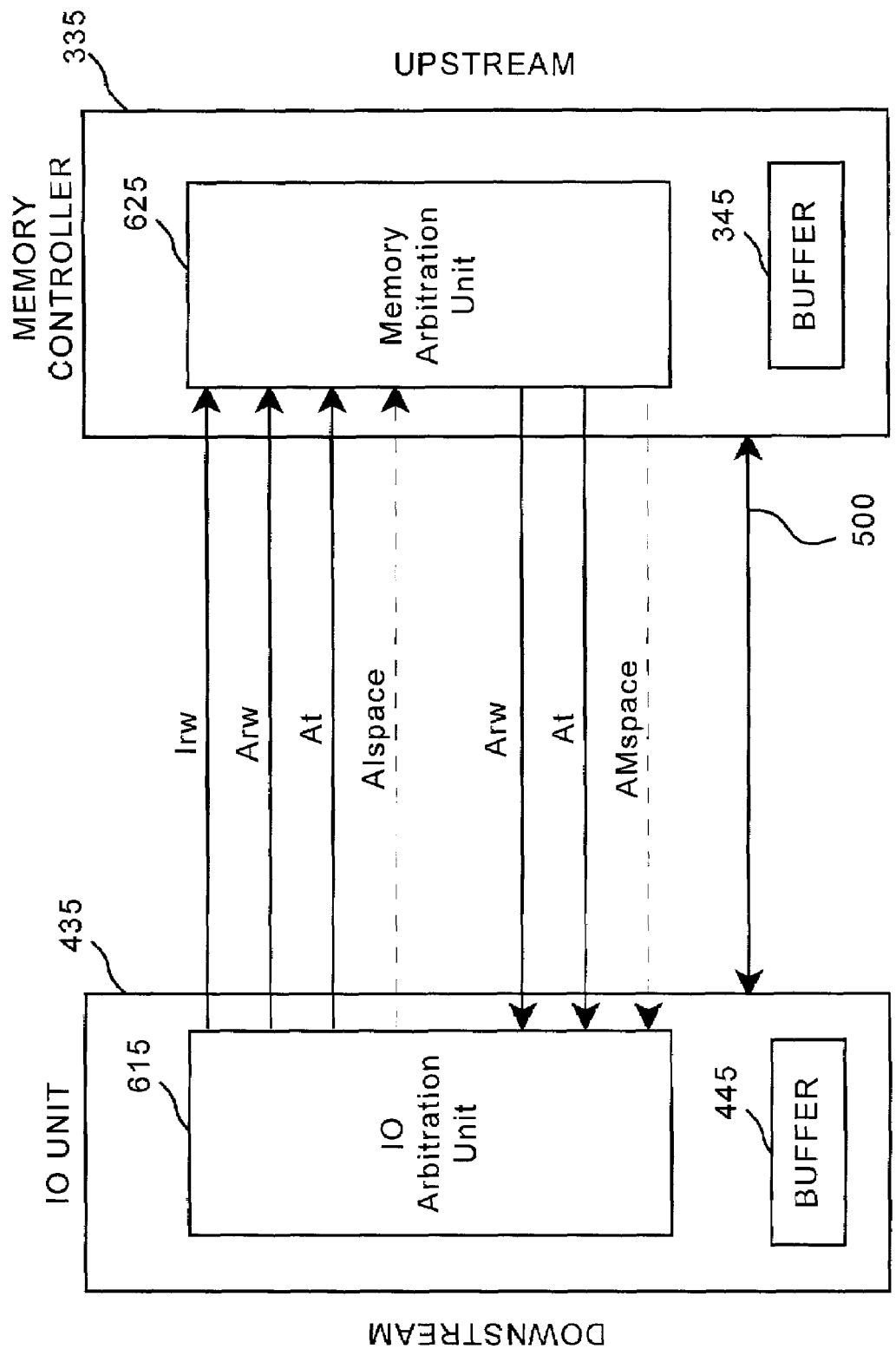
FIG. 7 is a block diagram of a system that schedules isochronous and asynchronous transactions over a half duplex link according to another embodiment of the present invention.

FIG. 7 is a block diagram of a system that schedules isochronous and asynchronous transactions over a half duplex link 500 according to another embodiment of the present invention. The system includes an IO unit 435 that communicates with a memory controller 335 over the half duplex link 500. According to this embodiment, isochronous bus transactions are only initiated by the IO unit 435 and are serviced by memory controlled by the memory controller 335. Asynchronous bus transactions may be initiated by either the IO unit 435 or the memory controller 335.

According to this embodiment of the present invention, the IO unit 435 includes an IO arbitration unit 615 and the memory controller 335 includes a memory arbitration unit 625. The IO arbitration unit 615 determines which transaction ready to be serviced at the IO unit 435, if any, should be scheduled to be transferred over the half duplex link 500. Likewise, the memory arbitration unit 625 determines which transaction ready to be serviced at the memory controller 335, if any, should be scheduled to be transferred over the half duplex link 500.

As before, isochronous requests for the half duplex link 500 can be completed during the service period, perhaps by taking priority over asynchronous requests. Thus, an asynchronous request can only make use of the half duplex link 500 when there is no ready for service isochronous request. In addition to the half duplex link 500, "sideband" signals apart from the link transfer state and request information between the IO arbitration unit 615 and the memory arbitration unit 625. As described below, this information is used to schedule ready for service isochronous and asynchronous transaction requests according to service periods.

For example, an "isochronous read request" and an "isochronous write request" are upstream states (Irw) that indicate if the IO unit 435 will be making use of the next service period for the indicated memory access. As used herein, the term "upstream" refers to the memory controller 335 side of the half duplex link 500, and the term "downstream" refers to the IO unit 435 side of the link 500.

An "isochronous read return request" (not shown in FIG. 7) is a downstream state (It) that indicates if the memory controller 335 will be making use of the next service period for the indicated memory access. This signal may not be required if the IO unit 435 tracks when the read return will occur in a synchronous pipelined memory system.

An "asynchronous memory read/write request" and an "IO read return request" are downstream states (Arw and At, respectively) that indicate if the memory controller 335 wants to make use of the next service period for asynchronous read/write requests or the response from a previous asynchronous IO unit 435 read request.

An "asynchronous IO read/write request" and a "memory read return" are upstream states (Arw and At, respectively) that indicate if the IO unit 435 wants to make use of the next service period for asynchronous read/write requests or the response from a previous asynchronous memory controller 335 read request.

An "asynchronous IO space" and an "asynchronous memory space" are states (AIspace and AMspace, respectively) that allow more efficient use of interconnect cycles by avoiding an asynchronous request on the half duplex link 500 if there is insufficient space in the receiving component's buffers 445, 345. The asynchronous IO space is an upstream state that indicates if the IO unit 435 has space in the buffer 445 to accept an access request. The asynchronous memory space is a downstream state that indicates if the memory controller 335 has space in the buffer 345 to accept an access request. These states may allow, for example, better arbitration selection when the memory service time period for asynchronous information is variable and unpredictable.

The above states and requests are used by the arbitration units 615, 625 to simultaneously determine what access request, or ready for service transaction, can use the half duplex link 500 in the next service period. The states may be available before the next service period to avoid race conditions and to ensure that both arbitration units 615, 625 produce the same result.

The general arbitration unit 615, 625 processing is as follows. Do not allow an asynchronous request if doing so would make it impossible to complete the required number of isochronous requests before the end of the service period. Otherwise, let an asynchronous request use the service period if there is an asynchronous request from only one device. If there are requests of the same type (e.g. isochronous or asynchronous) from both devices, arbitrate between device requests according to an arbitration algorithm. The arbitration algorithm may be as simple as "every other request," or may take into account knowledge of different bandwidth demands or sequences of accesses, if desired.

The present invention may, for example, be used in a memory controller that supports both asynchronous and isochronous high bandwidth, pipelined data transfers. The system can be low cost and deliver high quality isochronous data bandwidth while still delivering competitive asynchronous data bandwidth and latency. Embodiment of the present invention may provide a low cost solution with minimum impact to implement a synchronous memory system for streaming data.

Although various embodiments are specifically illustrated and described herein, it will be appreciated that modifications and variations of the present invention are covered by the above teachings and within the purview of the appended claims without departing from the spirit and intended scope of the invention. For example, although specific arbitration algorithms were used to illustrate embodiments of the present invention, it will be appreciated that other types of arbitration algorithms will also fall within the scope of the invention. Moreover, the present invention applies to a broad range of topologies for connecting, for example, memory and other computing devices, and is therefore a general architectural approach that includes a broad range of specific implementations. Also, FIG. 7 illustrated an approach where all isochronous transfers were initiated from one end of the half duplex link (the IO controller). Similar approaches where isochronous transfers are initiated on either end also fall within the scope of this invention.

In addition, although particular standards and techniques were described with respect to the isochronous transfer of information, it will be understood that the present invention is not limited to a particular standard or technique. Finally, although software or hardware are described to control certain functions, such functions can be performed using either software, hardware or a combination of software and hardware, as is also known in the art. As is also known, software may be stored, such as in memory, in the form of instructions, including micro-code instructions, adapted to be executed by a processor. As used herein, the phrase "adapted to be executed by a processor" encompasses instructions that need to be translated before being executed by the processor.

What is claimed is:

1. A method comprising:
scheduling an isochronous transaction in service period N, which is one of a plurality of service periods that comprise a flow of information over a half duplex link between a first device and a second device, if the isochronous transaction is ready to be serviced before service period N at one of the first device and the second device;
scheduling, in service period N, an asynchronous transaction ready to be serviced at one of the first device and the second device if no isochronous transaction is ready to be serviced before service period N;
scheduling the asynchronous transaction ready to be serviced at the first device if no asynchronous transaction is ready to be serviced at the second device;
scheduling the asynchronous transaction ready to be serviced at the second device if no asynchronous transaction is ready to be serviced at the first device; and
scheduling the asynchronous transaction ready to be serviced at one of the first device and the second device, according to an arbitration algorithm, if the asynchronous transactions are ready to be serviced at both the first device and the second device.

2. The method of claim 1, wherein the arbitration algorithm schedules the asynchronous transactions ready to be serviced at the first device and the second device alternately.

3. The method of claim 1, wherein the arbitration algorithm schedules the asynchronous transactions based on available buffer space in at least one of the first device and the second device.

4. The method of claim 1, wherein the arbitration algorithm is executed at an arbitration unit coupled to both the first device and the second device.

5. The method of claim 1, wherein the arbitration algorithm is executed at both (1) a first arbitration unit associated with the first device and (2) a second arbitration unit associated with the second device.

6. An apparatus to schedule transactions over a half duplex link between a first device and a second device, information flowing over the half duplex link being divided into a plurality of service periods, comprising:
a first communication port configured to communicate with one of the first device and the second device; and
an arbitration unit coupled to said first communication port and configured to (1) schedule an isochronous transaction in service period N if the isochronous transaction is ready to be serviced before the service period N at one of the first device and the second device and (2) schedule, in the service period N, an asynchronous transaction ready to be serviced at one of the first device and the second device if no isochronous transaction is ready to be serviced before the service period N;
wherein said arbitration unit is configured to schedule an asynchronous transaction by (a) scheduling the asynchronous transaction ready to be serviced at the first device if no asynchronous transaction is ready to be serviced at the second device; (b) scheduling the asynchronous transaction ready to be serviced at the second device if no asynchronous transaction is ready to be serviced at the first device; and (c) scheduling the asynchronous transaction ready to be serviced at one of the first device and the second device, according to an arbitration algorithm, if the asynchronous transactions are ready to be serviced at both the first device and the second device.

7. The apparatus of claim 6, wherein the arbitration algorithm schedules the asynchronous transactions ready to be serviced at the first device and the second device alternately.

8. The apparatus of claim 6, wherein the arbitration algorithm schedules the asynchronous transactions based on available buffer space in at least one of the first device and the second device.

9. A memory system, comprising:
an Input Output (IO) unit;
a memory controller;
a half duplex link coupled between said IO unit and said memory controller, information flowing over said half duplex link being divided into a plurality of service periods; and
an arbitration unit coupled between said IO unit and said memory controller, said arbitration unit being configured to (1) schedule an isochronous transaction in service period N if the isochronous transaction is ready to be serviced before the service period N at one of said IO unit and said memory controller and (2) schedule, in the service period N, an asynchronous transaction ready to be serviced at one of said IO unit and said memory controller if no isochronous transaction is ready to be serviced before the service period N.

10. The system of claim 9, wherein said arbitration unit is configured to schedule an asynchronous transaction by (a) scheduling the asynchronous transaction ready to be serviced at the first device if no asynchronous transaction is ready to be serviced at the second device; (b) scheduling the asynchronous transaction ready to be serviced at the second device if no asynchronous transaction is ready to be serviced at the first device; and (c) scheduling the asynchronous transaction ready to be serviced at one of the first device and the second device, according to an arbitration algorithm, if the asynchronous transactions are ready to be serviced at both the first device and the second device.

11. A memory system, comprising:
an Input Output (IO) unit;
a memory controller;
a half duplex link coupled between said IO unit and said memory controller, information flowing over the half duplex link being divided into a plurality of service periods;
a first arbitration unit associated with said IO unit and configured to (1) schedule an isochronous transaction in service period N if the isochronous transaction is ready to be serviced before the service period N at one of said IO unit and said memory controller and (2) schedule, in the service period N, an asynchronous transaction ready to be serviced at one of said IO unit and said memory controller if no isochronous transaction is ready to be serviced before the service period N; and a second arbitration unit associated with said memory controller and configured to (1) schedule an isochronous transaction in the service period N if the isochronous transaction is ready to be serviced before the service period N at one of said IO unit and said memory controller and (2) schedule, in the service period N, an asynchronous transaction ready to be serviced at one of said IO unit and said memory controller if no isochronous transaction is ready to be serviced before the service period N.

12. The system of claim 11, wherein each of said first and second arbitration units are configured to schedule an asynchronous transaction by (a) scheduling the asynchronous transaction ready to be serviced at the first device if no asynchronous transaction is ready to be serviced at the second device; (b) scheduling the asynchronous transaction ready to be serviced at the second device if no asynchronous transaction is ready to be serviced at the first device; and (c) scheduling the asynchronous transaction ready to be serviced at one of the first device and the second device, according to an arbitration algorithm, if the asynchronous transactions are ready to be serviced at both the first device and the second device.

13. An article of manufacture comprising a computer-readable medium having stored thereon instructions adapted to be executed by a processor, the instructions which, when executed, cause the processor to perform:

scheduling an isochronous transaction in service period N, which is one of a plurality of service periods that comprise a flow of information over a half duplex link between a first device and a second device, if the isochronous transaction is ready to be serviced before the service period N at one of the first device and the second device; and scheduling, in the service period N, an asynchronous transaction ready to be serviced at one of the first device and the second device if no isochronous transaction is ready to be serviced before the service period N;

scheduling the asynchronous transaction ready to be serviced at the first device if no asynchronous transaction is ready to be serviced at the second device;

scheduling the asynchronous transaction ready to be serviced at the second device if no asynchronous transaction is ready to be serviced at the first device; and scheduling, in the service period N, an asynchronous transaction ready to be serviced at one of the first device and the second device, according to an arbitration algorithm, if the asynchronous transactions are ready to be serviced at both the first device and the second device.

* * * * *